Patented June 6, 1939

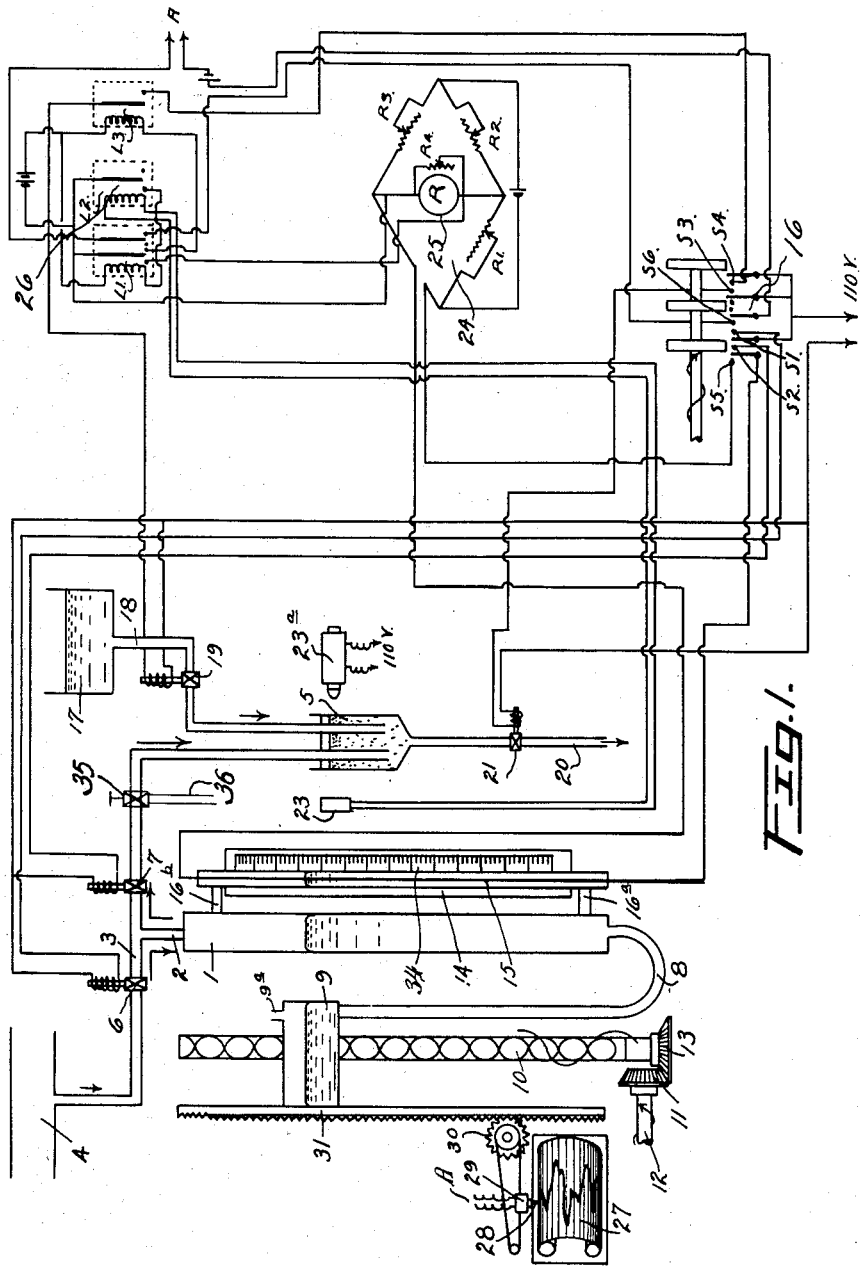

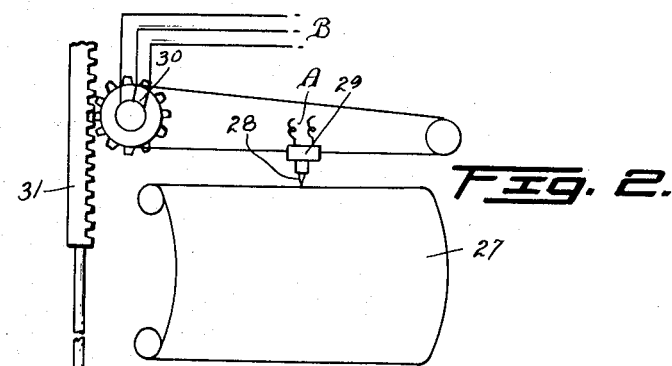
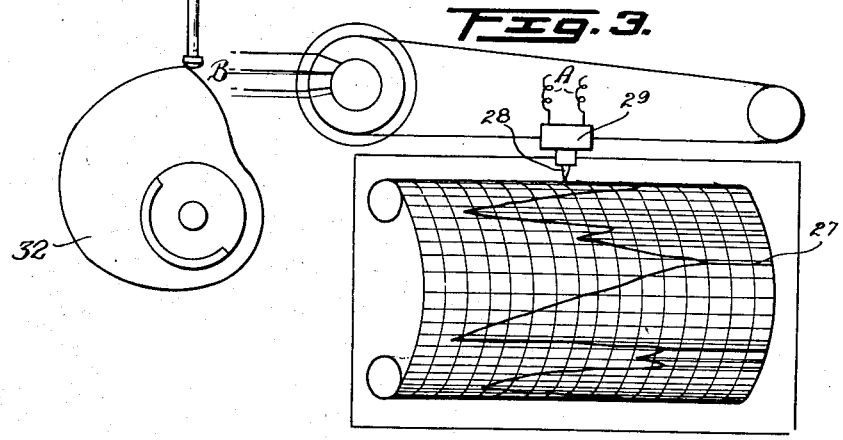
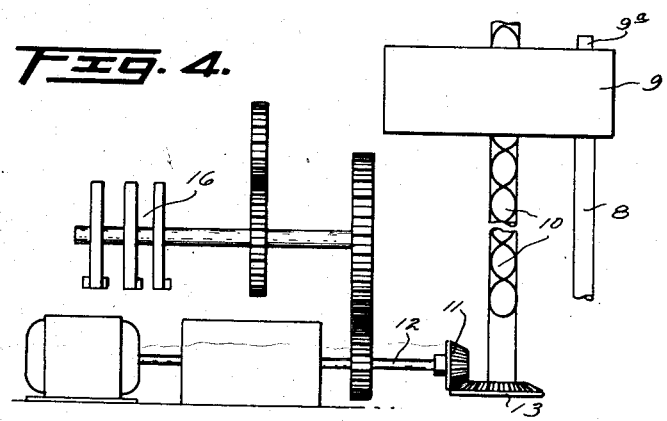

2,161,453

UNITED STATES PATENT OFFICE 2,161,453

AUTOMATIC FLUID ANALYZER

Arthur Henry Wilson Busby and Robie Kerr Blois, Trail, British Columbia, Canada, assignors to The Consolidated Mining & Smelting Company of Canada, Limited, Montreal, Quebec, Canada, a corporation of Canada Application May 22, 1937, Serial No. 144,232

5 Claims. (Cl. 23—253)

Our invention relates to an automatic fluid analyzer and is for the purpose of automatically sampling and analyzing fluids and for producing a continuous and permanent record of one or more of the constituent parts thereof.

The sampling and subsequent analysis of fluids form an important part in the operation of industries, particularly those, such as the metallurgical and chemical industries, heating plants, and the like. In many instances the only means of controlling the operation of a process is from the results obtained by analyses and it is of the utmost importance that such results are accurate and available as a permanent record. In the analysis of a gas stream for example, such as evolved during combustion, it is usually not only desirable but necessary to have available a continuous record of the percentage of such constituents as carbon monoxide, carbon dioxide, sulphur dioxide, nitrogen and oxygen.

In the sampling and analysis of a gas stream it is customary to use such apparatus as an "Orsat" or the "Reich test" wherein an operator, at predetermined intervals, samples the gas stream and absorbs therefrom the individual constituents in suitable absorbent media. In such analyses, however, the accuracy thereof depends on the skill and attention of the operator and often erroneous results are obtained in operating the apparatus such as in the volume of the sample or overrunning the "end point" in titrating the sample against the known standard solution.

One of the important features of our invention lies in the operation of our device by means of which the human element may be entirely eliminated and each sample of the fluid withdrawn from the main body is of constant volume. Differences of volume owing to atmospheric conditions and the like are eliminated. The sampling of the fluid, of course, is preferably entirely automatic.

A further feature of our invention lies in the analyzing of the fluid sample during which the percentage of each constituent part is accurately determined and a continuous permanent record made thereof. The only limitation to the automatic analysis is that in the titrating step the "end point" of each constituent under analysis must be defined by a change of colour either in the standard solution used for the titration or the solution under analysis or in an indicator such as methyl orange, phenolphthalein, or the like, which may have been added.

These and additional features of our invention will be apparent from the following description and accompanying drawings in which:

Fig. 1 is a preferred embodiment of our invention, illustrated diagrammatically.

Fig. 2 shows alternative means for operating the recording mechanism.

Fig. 3 is an enlarged view of the chart and recording pen.

Fig. 4 is an enlarged view of the timing device and reversing worm driving mechanism.

Like reference characters refer to like parts throughout the specification and drawings.

It will be clearly understood, of course, that the preferred embodiment of our invention described and illustrated hereinafter outlines the operations in sampling and analyzing a gas stream. It will be apparent that with minor modifications of the same apparatus a liquid solution may be sampled and analyzed in a similar manner. Also with minor modifications the apparatus is adaptable to determine the percentage of each of a plurality of constituents, provided that no reactions take place within the apparatus which would interfere with the exact determination of the percentage of the constituent and in the titrating step the "end point" must be defined by a change in colour.

The operation of our method is effected in general in three steps; (a) the sampling step; (b) the titrating step; and (c) the recording step; all carried out automatically and progressively as shall hereinafter be explained.

In the preferred embodiment of our invention illustrated in the drawings the sampling mechanism comprises the burette 1 of a size determinable by the desired volume of the sample, say 1000 c.c., and is formed preferably of rigid material such as iron pipe, glass or, where necessary, a corrosion resistant alloy.

The conduit 2 communicates with the top of the burette 1 and with the sample conduit 3. One end of the sample conduit 3 communicates with the main gas conduit 4 while the other end extends into the interior of the glass vessel 5. The electrically operated automatic valve 6 is provided in conduit 3 located between the main gas conduit 4 and the conduit 2. The valve 6 is connected electrically to the timing switch 16 at $S_1$. The electrically operated automatic valve 7 is provided in conduit 3 and located between conduit 2 and the glass vessel 5. The valve 7 is connected electrically to the timing switch 16 at $S_2$.

A flexible tube 8, formed of material such as rubber, extends from the base of the burette 1 to the aspirating pot 9.

The aspirating pot 9, provided with an air vent 9a, moves on the reversing worm 10. A driving pinion 11, mounted on the shaft 12, is driven by a suitable motor and meshes with the driven reducing gear 13 mounted at the base of the worm 10.

The reducing gear 13 also drives the timing switches 16 as shall be explained hereinafter.

While the aspirating pot 9 may be designed to move upwardly and downwardly on the worm 10 in any one of several ways we prefer to design the threads in such a manner that the worm is driven continuously in one direction while the aspirating pot 9 is carried upward by the ascending thread to the top of the stroke where it is taken by the descending thread and carried to the bottom of the stroke where it is again taken by the ascending thread and the movement is repeated.

The aspirating pot 9 is filled with a suitable liquid such as mercury and is so positioned in relation to the burette 1 that at the top of the stroke the burette 1 is completely filled with mercury while at the bottom of the stroke the burette 1 is empty of mercury. The mercury flows freely through the flexible tubing 8.

The burette 1 is further provided with a side tube 14 containing a resistance wire of platinum or other suitable material of suitable size. The side tube 14 communicates with the burette 1 through the conduits 16a—16b and by means of which the height of the column of mercury in the side tube is always equal to the height in the burette 1.

The vessel 17 is adapted to receive and act as a reservoir for the standard titrating solution, such as starch-iodine solution when analyzing sulphur dioxide bearing gases for sulphur dioxide. The vessel 17 communicates with the vessel 5, which may be of glass or other transparent material, through the conduit 18 in which is provided the electrically operated automatic valve 19. The valve 19 is connected electrically to the timing switch 16 at $S_4$ and to the relay switch 26 in such a manner that the timing switch opens the valve and the relay switch closes it. The solution in vessel 5 is evacuated, after use, through the conduit 20 in which is provided the electrically operated automatic valve 21 which is connected electrically to the timing switch 16 at $S_3$.

A lamp and projector 23a focuses a beam of light on the photo-electric cell 23, the beam passing through the vessel 5 to contact the cell 23.

The electrical circuit by means of which the sampling, analyzing and recording are automatically effected comprises a Wheatstone bridge 24, a galvanometer 25, an electrical relay switch 26 and the timing switches 16, all suitably connected to the electrically operated parts as shall hereinafter be explained.

The platinum wire 15 in the side tube 14 constitutes one arm of the Wheatstone bridge 24, the other three arms being the adjustable resistances $R_1$, $R_2$ and $R_3$ respectively, and which are suitably connected to the timing switch 16 at $S_5$.

The galvanometer 25, which is connected across the Wheatstone bridge 24, is of the recording type and is suitably shunted by means of adjustable resistance coil $R_4$. The galvanometer 25 is connected to the relay switch 26 at $L_1$ for the purpose of short-circuiting the galvanometer 25 as will be described hereinafter. As the mercury rises in the tube 14 the resistance of the arm of the Wheatstone bridge 24 formed by the platinum wire is changed and causes the bridge to become unbalanced which in turn causes the recording galvanometer to deflect. The amount of the deflection, therefore, is proportional to the height of the mercury column in the glass tube 14 and burette 1.

The mechanical recording mechanism comprises a moving chart 27 across which a pen 28 is caused to move horizontally. The pen 28 is connected to a small electro-magnet 29 capable of raising the pen from the chart 27. The pen 28 is driven across the chart by means of the pinion 30 which engage the rack 31 mounted on the aspirator pot 9.

An alternative method of driving the pinion 30, and thus driving the pen 28, is to actuate the rack 31 by a cam 32 mounted on the shaft driving the switches 16 as shown in Figures 2 and 3. A still further alternative, particularly for remote recording, is to drive the pen with a small synchronous motor or alternatively to use a Selsyn or Autosyn type of coupling. Suitable contacts are arranged to start the motor at the desired time and to return the pen to zero position after each cycle.

The photo-electric cell 23 is connected to the electrical relay switch 26 at $L_2$. The electrical relay switch 26 is further suitably connected to the timing switch 16 at $S_6$.

In order to obtain a clear understanding of the manner in which our apparatus is operated it will be necessary to begin with the aspirator pot 9 at the top of its stroke at which time the burette 1 and side tube 14 are filled with mercury. Simultaneously when the aspirator pot 9 starts its downward stroke the switch $S_1$ closes thereby opening valve 6 and at the same time the switch $S_2$ closes valve 7. As the pot 9 travels downwardly the mercury falls in the burette 1 and side tube 14 and gas is drawn from the main gas stream through conduit 3 into the burette and side tube.

During the downward stroke valve 21 is caused to open by the closing of switch $S_3$ thereby allowing the spent solution in vessel 5 to drain away. The rate of evacuation is readily calculated and, after sufficient time has elapsed to permit the emptying of the vessel, valve 21 is closed. A few seconds later valve 19 is opened by the closing of switch $S_4$ and the titrating solution in vessel 17 is permitted to flow into vessel 5. The beam of light fixed on the photo-electric cell 23 is so adjusted that when a predetermined quantity of solution enters vessels 5 it intercepts the light beam which causes relay $L_2$ of electrical relay switch 26 to open which in turn opens relay $L_1$ which in turn closes relay $L_3$ to close valve 19 and stop the flow of titrating solution to vessel 5. These operations are, of course, simultaneous.

The galvanometer circuit, which was short circuited in the preceding test at the instant the solution in vessel 5 became decolourized, is now open. To prevent the bridge circuit being operative when this is done the arm of the bridge containing the platinum resistance wire 15 is opened at $S_5$ of the time switch 16 at the beginning of the downward stroke of aspirating pot 9. This circuit remains open until the beginning of the upward stroke of pot 9 at which time $S_5$ closes thereby making the bridge circuit operative.

The above operations all take place during the downward stroke of aspirator pot 9, and, during which, the two recorders, mechanical and electrical, are prevented from operating by switches mounted at 16.

When the aspirator pot 9 has reached the bottom of its stroke valve 6 is closed and valve 7 is opened and the pot commences its upward stroke causing the mercury in the burette 1 and side tube 14 to rise thereby forcing the gas through conduit 3 into the starch-iodine solution in vessel 5. As the mercury rises in the side tube 14 the resistance of the Wheatstone bridge circuit is altered causing galvanometer 25 to deflect. Also at the desired time the mechanical recorder pen 28 is caused to start its travel across the chart 27.

At the instant when sufficient gas has passed through the starch-iodine solution to decolourize it, the beam of light again falls on the photo-electric cell 23 which causes relay $L_2$ to close, which closes relay $L_1$ and which causes short-circuiting of the galvanometer to cause the pen of the electrical recorder to return to zero and the pen 28 of the mechanical recorder to be raised from the chart 27, thus indicating the exact amount of gas necessary to decolourize the known quantity of starch-iodine solution of known strength. This in turn may be used as a measure of the percent sulphur dioxide in the gas.

It should be noted that although relay $L_3$ is now opened yet valve 19 is not affected at this time since this circuit is open at switch $S_4$ of the timing switch 16.

The aspirator pot 9 continues its upward stroke until it has reached its uppermost limit and the cycle recommences.

The electrical recorder may be adjusted to give any desired range by merely altering the constant of the Wheatstone bridge circuit, and/or the strength and quantity of starch-iodine solution used. The mechanical recorder, while not quite so flexible as the electrical recorder, can also be adjusted to give a very wide range.

It might also be mentioned that, with the electrical recorder temperature compensation can be allowed for by including a temperature compensator in the Wheatstone bridge circuit. In the analysis, also, care is taken to control the moisture content of the gas sample as variations in the moisture content would upset the volumetric method. Before the analysis proper, therefore, we prefer to pass the gas sample through a drying tube containing any of the known dehydrating chemicals which removes the moisture to any predetermined degree of dryness but which does not react with the gases in the sample.

As a specific example of the operation of our invention it is desired to determine the sulphur dioxide concentration of a gas containing between 4% and 9% sulphur dioxide. The amount of starch-iodine solution admitted to vessel 5 is exactly 100 c. c. of 1/50 normal solution. The Wheatstone bridge circuit of the galvanometer is adjusted to start recording when 280 c. c. of gas corresponding to 9% of sulphur dioxide for that amount of iodine has passed through the solution. The pinion of the mechanical recorder is also set to engage at this point and to disengage when 633 c. c. of gas have passed corresponding to 4% of sulphur dioxide.

The upward and downward strokes of aspirator pot 9 on the worm 10 are timed to make one complete cycle in fifteen minutes, that is to say drawing in gas for seven and one half minutes and forcing it out for seven and one half minutes.

In addition to the advantages hereinbefore set out, we have found that, if desired, an operator may take a check sample from the identical sample used by the machine as there is a sufficient volume of gas left in the burette for this purpose after the "end point" has been reached in the titrating step.

Provision is made for the drawing of a check sample from the burette 1 by placing a graduated scale 34 behind the side tube 14 and providing a three way stop cock or valve 35 in the conduit 3, preferably between the automatic valve 7 and the glass vessel 5. One end of the conduit 36 is secured to the valve 35 which may be regulated to permit the flow of sample into the glass vessel 5 or into the conduit 36. The volume of sample withdrawn from the burette 1 through the conduit 36 may be readily determined from the graduated scale 34.

Certain other types of recorder are only adapted to the analysis of binary mixtures of the gas of interest and the diluent gas, where these gases have different thermal conductivities, or to the analysis of mixtures in which one gas is of interest and the diluent gas is a mixture composed of several gases, variations in the relative proportions of which do not affect the thermal conductivity of the diluent mixture itself. Our apparatus, on the other hand, determines the gas of interest regardless of the thermal conductivity of the diluent gases mixed with it, provided, of course, that these diluent gases have no chemical reaction upon the reagent solution.

It will be apparent, of course, that various modifications may be made in the specific method and apparatus embodied herein. For example a known or predetermined quantity of a liquid sample may be passed to the vessel 5 and a continuously known quantity of the standard titrating solution added until the "end point" is reached. In this instance the apparatus would be adjusted to stop the flow of the titrating solution and the recording mechanism adjusted to record the amount of solution necessary to titrate a predetermined quantity of sample.

A further modification may also be made by passing the beam of light through a prism, the prism being so adjusted to reflect all or any desired colours of the spectrum and the photoelectric cell adjusted in such a manner that it is sensitive not only to a change in the strength of the light but also to a change in colour without an accompanying change of strength. The same result may be accomplished by the insertion of suitable light filters designed to cut out all except any desired colour or colours.

These and other modifications may be made without departing from the scope of the appended claims.

Having thus fully described our invention what we claim as new and desire to secure by Letters Patent is:

1. Fluid analyzing apparatus comprising a measuring chamber, liquid displacement means for alternately drawing a representative fluid sample into said measuring chamber and forcing it therefrom into a titration chamber in communication with said measuring chamber, said titration chamber being interposed between a light projector and a photo-electric cell, means controlled by said photo-electric cell for introducing a predetermined quantity of titrating solution into said titration chamber prior to the introduction of said sample thereinto, means controlled by said photo-electric cell for indicating the amount of sample necessary to cause the required color change at the "end-point" of the reaction between the sample and said titrating solution and means for discharging the contents of the titration chamber after completion of each analysis.

2. Fluid analyzing apparatus comprising a measuring chamber, means for alternately drawing a representative fluid sample into said measuring chamber and forcing it therefrom into a titration chamber in communication with said measuring chamber, said titration chamber being interposed between a light projector and a photo-electric cell, means controlled by said photo-electric cell for introducing a predetermined quantity of titrating solution into said titration chamber prior to the introduction of said sample thereinto and means controlled by said photo-electric cell for indicating the amount of sample necessary to cause the required color change at the "end-point" of the reaction between the sample and said titrating solution comprising a Wheatstone bridge circuit, the flow of current to which is controlled by said photo-electric cell, actuating a recording galvanometer, the resistance of one arm of said Wheatstone bridge circuit being dependent on the amount of sample in said measuring chamber.

3. Fluid analyzing apparatus comprising a measuring chamber, a liquid containing displacement vessel adapted to draw a representative fluid sample into said measuring chamber and to force it therefrom into a titration chamber in communication with said measuring chamber, said titration chamber being interposed between a light projector and a photo-electric cell, means controlled by said photo-electric cell for introducing a predetermined quantity of titrating solution into said titration chamber prior to the introduction of said sample thereinto, means controlled by said photo-electric cell for indicating the amount of sample necessary to cause the required color change at the "end-point" of the reaction between the sample and said titrating solution and means cooperating with said displacement vessel to record the required amount of sample.

4. Fluid analyzing apparatus comprising a measuring chamber, means for alternately drawing a representative fluid sample into said measuring chamber and forcing it therefrom into a titration chamber in communication with said measuring chamber, said titration chamber being interposed between a light projector and a photo-electric cell, means controlled by said photo-electric cell for introducing a predetermined quantity of titrating solution into said titration chamber prior to the introduction of said sample thereinto, means controlled by said photo-electric cell for indicating the amount of sample necessary to cause the required color change at the "end-point" of the reaction between the sample and said titrating solution and automatically operated valve means adapted to permit the drawing of the sample into the measuring chamber, the passing of the sample to the titration chamber, the introduction of the fresh titrating solution into the titration chamber for each sample analyzed and the removal of the contents of the titration chamber after each analysis is completed and means for timing the operation of each valve.

5. Fluid analyzing apparatus comprising a measuring chamber, means for alternately drawing a representative fluid sample into said measuring chamber and forcing it therefrom into a titration chamber in communication with said measuring chamber, said titration chamber being interposed between a light projector and a photo-electric cell, means controlled by said photo-electric cell for introducing a predetermined quantity of titrating solution into said titration chamber prior to the introduction of said sample thereinto, means controlled by said photo-electric cell for indicating the amount of sample necessary to cause the required color change at the "end-point" of the reaction between the sample and said titrating solution and means cooperating with said sample drawing means and controlled by said indicating means for recording the amount of sample passed into said titration chamber.

ARTHUR HENRY WILSON BUSBY.
ROBIE KERR BLOIS.